US011729810B2

United States Patent
Xia et al.

(10) Patent No.: US 11,729,810 B2
(45) Date of Patent: Aug. 15, 2023

(54) SYSTEM AND METHOD FOR POWER SAVINGS IN DISCONTINUOUS TRANSMISSION OPERATION

(71) Applicant: Huawei Technologies Co., Ltd., Shenzhen (CN)

(72) Inventors: Pengfei Xia, San Diego, CA (US); Young Hoon Kwon, Laguna Niguel, CA (US); Bin Liu, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 17/259,701

(22) PCT Filed: Sep. 19, 2018

(86) PCT No.: PCT/US2018/051770
§ 371 (c)(1),
(2) Date: Jan. 12, 2021

(87) PCT Pub. No.: WO2020/013872
PCT Pub. Date: Jan. 16, 2020

(65) Prior Publication Data
US 2021/0337551 A1    Oct. 28, 2021

Related U.S. Application Data

(60) Provisional application No. 62/697,527, filed on Jul. 13, 2018.

(51) Int. Cl.
*H04W 72/542* (2023.01)
*H04W 76/28* (2018.01)
(Continued)

(52) U.S. Cl.
CPC ......... *H04W 72/542* (2023.01); *H04L 5/0051* (2013.01); *H04L 25/0226* (2013.01);
(Continued)

(58) Field of Classification Search
CPC ... H04W 72/542; H04W 76/28; H04W 72/23; H04W 72/046; H04L 5/0051; H04L 25/0226
(Continued)

(56) References Cited

U.S. PATENT DOCUMENTS

2015/0359035 A1* 12/2015 Lee .................. H04W 76/28
370/311
2017/0251518 A1* 8/2017 Agiwal ................ H04W 76/28
(Continued)

FOREIGN PATENT DOCUMENTS

| CN | 101572945 A | 11/2009 |
|----|-------------|---------|
| CN | 102548004 A | 7/2012 |
| WO | 2018082675 A1 | 5/2018 |

OTHER PUBLICATIONS

Nokia et al., "Beam Recover in NR" 3GPP TSG-RAN WG2 Meeting #96, R2-167713, Reno, USA, Nov. 14-18, 2016, 4 pages.

*Primary Examiner* — Christopher R Crompton
(74) *Attorney, Agent, or Firm* — Slater Matsil, LLP

(57) ABSTRACT

A method for operating an access node includes sending to a user equipment (UE) configuration information of a discontinuous reception (DRX) mode including DRX-ON periods for sending physical downlink control channels (PDCCHs) to the UE, and configuration information for an uplink transmission associated with a DRX-ON period, the uplink transmission is configured for beam quality confirmation of a PDCCH transmitted during the DRX-ON period associated with the uplink transmission, receiving the uplink transmission, wherein a receive beam used to receive the uplink transmission and a transmit beam used to transmit the PDCCH transmitted during the DRX-ON period are beam correspondent, and determining a beam quality measure-
(Continued)

ment for a channel between the access node and the UE in accordance with the received uplink transmission.

20 Claims, 11 Drawing Sheets

(51) Int. Cl.
*H04L 5/00* (2006.01)
*H04L 25/02* (2006.01)
*H04W 72/044* (2023.01)
*H04W 72/23* (2023.01)

(52) U.S. Cl.
CPC ......... *H04W 72/046* (2013.01); *H04W 72/23* (2023.01); *H04W 76/28* (2018.02)

(58) Field of Classification Search
USPC .......................................... 370/329
See application file for complete search history.

(56) References Cited

U.S. PATENT DOCUMENTS

2017/0302355 A1   10/2017   Islam et al.
2018/0092064 A1   3/2018    Ryu et al.
2018/0098287 A1   4/2018    Ang et al.
2018/0132252 A1   5/2018    Islam et al.
2018/0167883 A1   6/2018    Guo et al.

\* cited by examiner

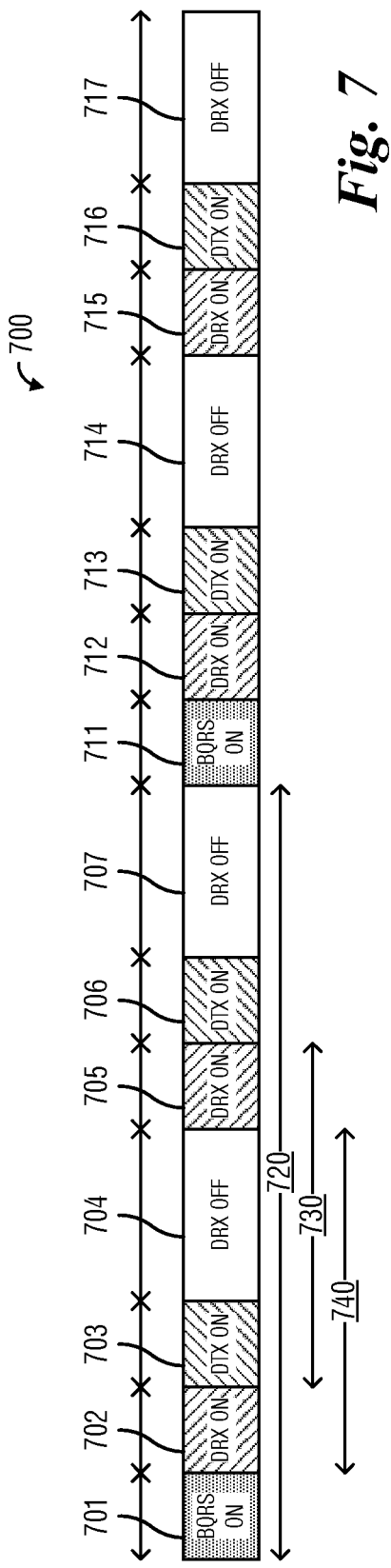
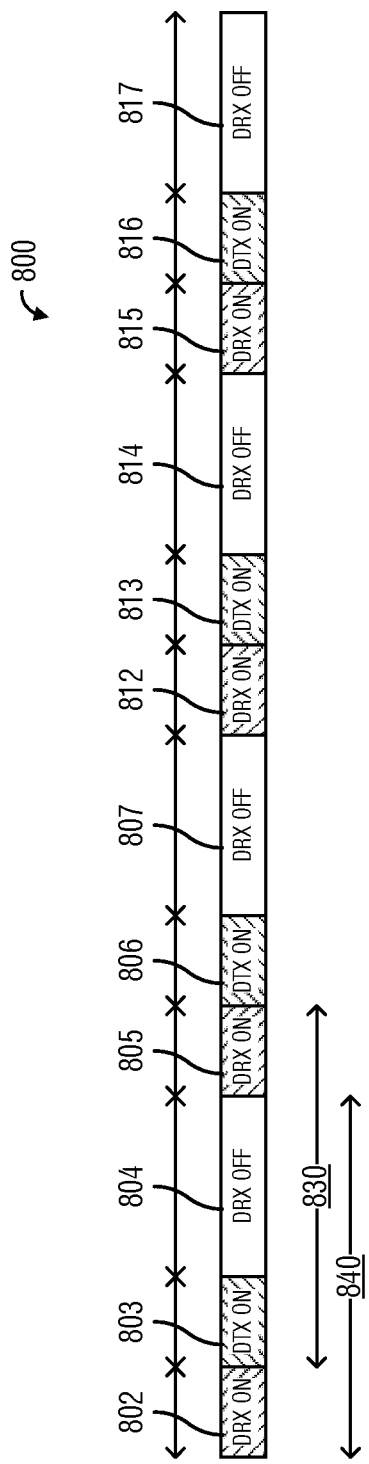

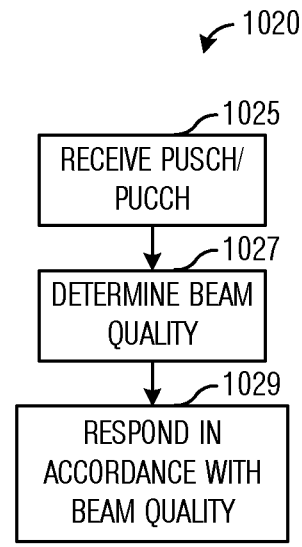
*Fig. 10B*
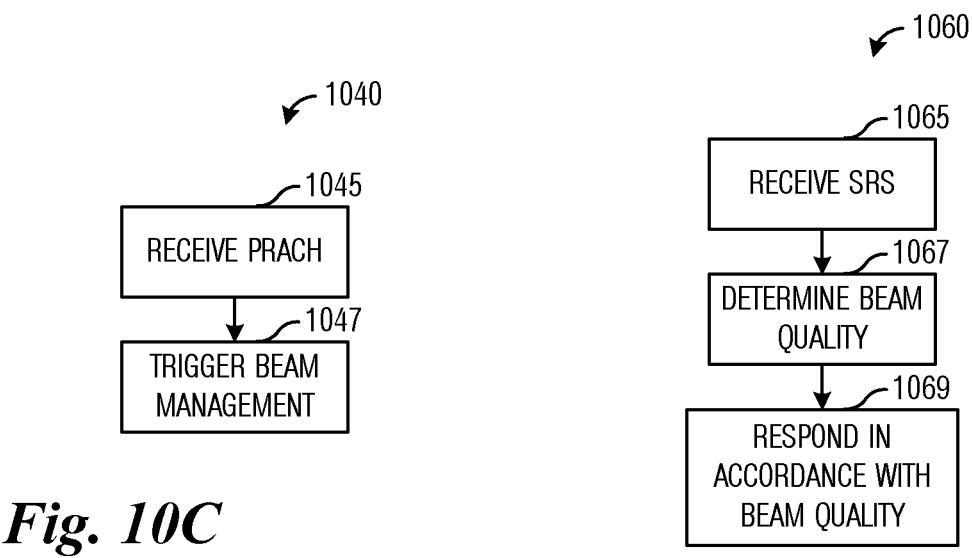
*Fig. 10C*
*Fig. 10D*

SYSTEM AND METHOD FOR POWER SAVINGS IN DISCONTINUOUS TRANSMISSION OPERATION

This application claims the benefit of International Application No. PCT/CN2018/051770, filed on Sep. 19, 2018, which claims priority to and the benefit of U.S. Provisional Application No. 62/697,527, entitled "System and Method for Power Savings in Discontinuous Transmission Operation," filed on Jul. 13, 2018, which application is hereby incorporated herein by reference.

TECHNICAL FIELD

The present disclosure relates generally to a system and method for digital communications, and, in particular embodiments, to a system and method for power saving in discontinuous transmission (DTX) operation.

BACKGROUND

Discontinuous reception (DRX) operation is a technique used to help improve power savings in wireless communications devices. DRX operation comprises two of time periods: DRX-on and DRX-off. In a DRX-on period, a wireless communications device is actively detecting for signals intended for the wireless communications device, while in a DRX-off period, there are no signals intended for the wireless communications device and the wireless communications device can enter a power saving mode (the power saving mode is commonly referred to as a sleep mode, a sleep state, a reduced power mode, and so on), consuming very little power.

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss. However, the beams are prone to blockage. Therefore, a beam that is being used for communications may become blocked and fail, leaving the communications device without a connection.

Due to the fragile nature of the beams used for communications in 5G NR communications systems, it is possible that a beam used by the wireless communications device to communicate during a previous DTX-ON period to have become blocked, failed, or otherwise broken. In this situation, it is not guaranteed that the wireless communications device will be able to transmit signals when it wakes up and enters a DTX-ON period. Therefore, there is a need for systems and methods for power savings in DTX operation.

SUMMARY

In a first implementation form of the computer-implemented method according to the first aspect as such.

In a second implementation form of the computer-implemented method according to the first aspect as such or any preceding implementation form of the first aspect.

In a third implementation form of the computer-implemented method according to the first aspect as such or any preceding implementation form of the first aspect.

According to a first aspect, a computer-implemented method for operating an access node is provided. The computer-implemented method includes sending, by the access node, to a user equipment (UE) configuration information of a discontinuous reception (DRX) mode including DRX-ON periods for sending physical downlink control channels (PDCCHs) to the UE, and configuration information for an uplink transmission associated with a DRX-ON period, the uplink transmission is configured for beam quality confirmation of a PDCCH transmitted during the DRX-ON period associated with the uplink transmission, receiving, by the access node, the uplink transmission, wherein a receive beam used to receive the uplink transmission and a transmit beam used to transmit the PDCCH transmitted during the DRX-ON period are beam correspondent, and determining, by the access node, a beam quality measurement for a channel between the access node and the UE in accordance with the received uplink transmission.

In a first implementation form of the computer-implemented method according to the first aspect as such, wherein the received uplink transmission comprises a sounding reference signal (SRS).

In a second implementation form of the computer-implemented method according to the first aspect as such or any preceding implementation form of the first aspect, wherein determining the beam quality measurement comprises measuring a beam quality of the channel in accordance with the received uplink transmission.

In a third implementation form of the computer-implemented method according to the first aspect as such or any preceding implementation form of the first aspect, wherein the beam quality measurement conveys information about the beam quality during the DRX-ON period associated with the uplink transmission.

In a fourth implementation form of the computer-implemented method according to the first aspect as such or any preceding implementation form of the first aspect, wherein the beam quality measurement conveys information about an estimated beam quality during a subsequent DRX-ON period occurring after the DRX-ON period associated with the uplink transmission.

According to a second aspect, a computer-implemented method for operating a UE is provided. The computer-implemented method includes receiving, by the UE, from an access node configuration information of a DRX mode including a DRX-ON period for receiving a PDCCH from the access node, and configuration information for an uplink transmission associated with the DRX-ON period, the uplink transmission is configured for beam quality confirmation of a PDCCH transmitted during the DRX-ON period associated with the uplink transmission, receiving, by the UE, the PDCCH during the DRX-ON period, and sending, by the UE, an uplink transmission in accordance with the PDCCH, wherein a transmit beam used to transmit the uplink transmission and a receive beam used to receive the PDCCH during the DRX-ON period are beam correspondent.

In a first implementation form of the computer-implemented method according to the second aspect as such, wherein the uplink transmission comprises a SRS.

In a second implementation form of the computer-implemented method according to the second aspect as such or any preceding implementation form of the second aspect, further comprising determining by the UE, a beam quality measurement for a channel between the UE and the access node.

In a third implementation form of the computer-implemented method according to the second aspect as such or any preceding implementation form of the second aspect, wherein the beam quality measurement conveys information about the beam quality during the DRX-ON period in which the PDCCH is received.

In a fourth implementation form of the computer-implemented method according to the second aspect as such or any preceding implementation form of the second aspect, wherein the beam quality measurement conveys information about an estimated beam quality during a subsequent DRX-ON period occurring after the DRX-ON period in which the PDCCH is received.

In a fifth implementation form of the computer-implemented method according to the second aspect as such or any preceding implementation form of the second aspect, wherein the uplink transmission is sent in accordance with a decoding result of the PDCCH.

In a sixth implementation form of the computer-implemented method according to the second aspect as such or any preceding implementation form of the second aspect, wherein the uplink transmission is sent if the decoding result of the PDCCH is successful.

In a seventh implementation form of the computer-implemented method according to the second aspect as such or any preceding implementation form of the second aspect, wherein the uplink transmission is sent if the decoding result of the PDCCH is unsuccessful.

According to a third aspect, a computer-implemented method for operating an access node is provided. The method includes sending, by the access node, to a UE configuration information of a discontinuous reception (DRX) mode including DRX-ON periods for sending physical downlink control channels (PDCCHs) to the UE, and configuration information of a beam quality reference signal (BQRS) that is associated with a DRX-ON period, wherein the BQRS is configured for beam quality confirmation and beam failure recovery, wherein the BQRS has a spatial quasi-collocated (QCL) relationship with either a PDCCH transmitted during the DRX-ON period or a demodulation reference signal (DMRS) of the PDCCH transmitted during the DRX-ON period, and wherein the BQRS is also utilized in a simultaneously occurring beam failure recovery procedure; and sending, by the access node, the BQRS.

In a first implementation form of the computer-implemented method according to the third aspect as such, wherein the BQRS is sent during a beam failure recovery response (BFRP) window of the simultaneously occurring beam failure recovery procedure that is time-aligned with the DRX-ON period.

In a second implementation form of the computer-implemented method according to the third aspect as such or any preceding implementation form of the third aspect, wherein the BFRP window and the DRX-ON period are time-aligned in at least one of their starting times, or their ending times.

In a third implementation form of the computer-implemented method according to the third aspect as such or any preceding implementation form of the third aspect, wherein the BQRS is used to trigger a start of a monitoring for a PDCCH.

In a second implementation form of the computer-implemented method according to the third aspect as such or any preceding implementation form of the third aspect, wherein the BQRS is used to trigger a stop of a monitoring for a PDCCH.

According to a fourth aspect, an access node is provided. The access node includes a non-transitory memory storage comprising instructions, and one or more processors in communication with the memory storage. The one or more processors execute the instructions to send to a user equipment (UE) configuration information of a discontinuous reception (DRX) mode including DRX-ON periods for sending physical downlink control channels (PDCCHs) to the UE, and configuration information for an uplink transmission associated with a DRX-ON period, the uplink transmission is configured for beam quality confirmation of a PDCCH transmitted during the DRX-ON period associated with the uplink transmission, receive the uplink transmission, wherein a receive beam used to receive the uplink transmission and a transmit beam used to transmit the PDCCH transmitted during the DRX-ON period are beam correspondent, and determine a beam quality measurement for a channel between the access node and the UE in accordance with the received uplink transmission.

In a first implementation form of the access node according to the fourth aspect as such, wherein the received uplink transmission comprises a sounding reference signal (SRS).

In a second implementation form of the access node according to the fourth aspect as such or any preceding implementation form of the fourth aspect, wherein the one or more processors further execute the instructions to measure a beam quality of the channel in accordance with the received uplink transmission.

In a third implementation form of the access node according to the fourth aspect as such or any preceding implementation form of the fourth aspect, wherein the beam quality measurement conveys information about beam quality during the DRX-ON period associated with the uplink transmission.

In a fourth implementation form of the access node according to the fourth aspect as such or any preceding implementation form of the fourth aspect, wherein the beam quality measurement conveys information about an estimated beam quality during a subsequent DRX-ON period occurring after the DRX-ON period associated with the uplink transmission.

According to a fifth aspect, a user equipment (UE) is provided. The UE includes a non-transitory memory storage comprising instructions, and one or more processors in communication with the memory storage. The one or more processors execute the instructions to receive from an access node configuration information of a discontinuous reception (DRX) mode including a DRX-ON period for receiving a physical downlink control channel (PDCCH) from the access node, and configuration information for an uplink transmission associated with the DRX-ON period, the uplink transmission is configured for beam quality confirmation of a PDCCH transmitted during the DRX-ON period associated with the uplink transmission, receive the PDCCH during the DRX-ON period, and send an uplink transmission in accordance with the PDCCH, wherein a transmit beam used to transmit the uplink transmission and a receive beam used to receive the PDCCH during the DRX-ON period are beam correspondent.

In a first implementation form of the UE according to the fifth aspect as such, wherein the one or more processors further execute the instructions to determine a beam quality measurement for a channel between the UE and the access node.

In a second implementation form of the UE according to the fifth aspect as such or any preceding implementation form of the fifth aspect, wherein the uplink transmission is sent in accordance with a decoding result of the PDCCH.

In a third implementation form of the UE according to the fifth aspect as such or any preceding implementation form of the fifth aspect, wherein the uplink transmission is sent if the decoding result of the PDCCH is successful.

In a fourth implementation form of the UE according to the fifth aspect as such or any preceding implementation form of the fifth aspect, wherein the uplink transmission is sent if the decoding result of the PDCCH is unsuccessful.

According to a sixth aspect, an access node is provided. The access node includes a non-transitory memory storage comprising instructions, and one or more processors in communication with the memory storage. The one or more processors execute the instructions to send to a user equipment (UE) configuration information of a discontinuous reception (DRX) mode including DRX-ON periods for sending physical downlink control channels (PDCCHs) to the UE, and configuration information of a beam quality reference signal (BQRS) that is associated with a DRX-ON period, wherein the BQRS is configured for beam quality confirmation and beam failure recovery, wherein the BQRS has a spatial quasi-collocated (QCL) relationship with either a PDCCH transmitted during the DRX-ON period or a demodulation reference signal (DMRS) of the PDCCH transmitted during the DRX-ON period, and wherein the BQRS is also utilized in a simultaneously occurring beam failure recovery procedure, and send the BQRS.

In a first implementation form of the access node according to the sixth aspect as such, wherein the BQRS is sent during a beam failure recovery response (BFRP) window of the simultaneously occurring beam failure recovery procedure that is time-aligned with the DRX-ON period.

In a second implementation form of the access node according to the sixth aspect as such or any preceding implementation form of the sixth aspect, wherein the BFRP window and the DRX-ON period are time-aligned in at least one of their starting times, or their ending times.

An advantage of a preferred embodiment is that a UE can send a signal to an access node to help the access node determine the quality of a beam, thereby helping to reduce UE power consumption by helping to prevent unnecessary detection attempts.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates a diagram highlight DRX operation with DTX-ON periods according to example embodiments described herein;

FIG. 8 illustrates a diagram highlighting the use of DTX-ON periods without the presence of BQRSs according to example embodiments described herein;

FIGS. 10B-10D illustrate different example scenarios for signal or report receiving and processing at an access node according to example embodiments described herein;

DETAILED DESCRIPTION OF ILLUSTRATIVE EMBODIMENTS

Figure 1:
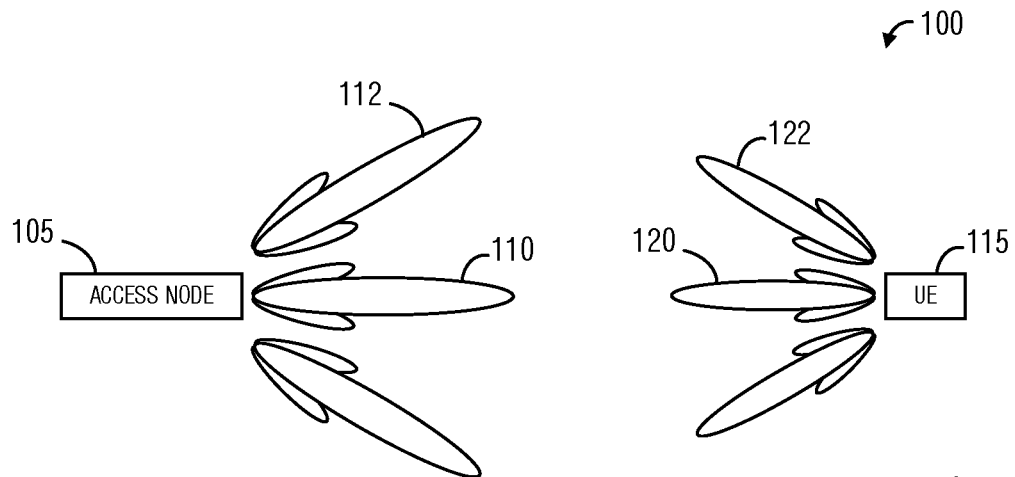
FIG. 1 illustrates an example wireless communications system.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example, access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
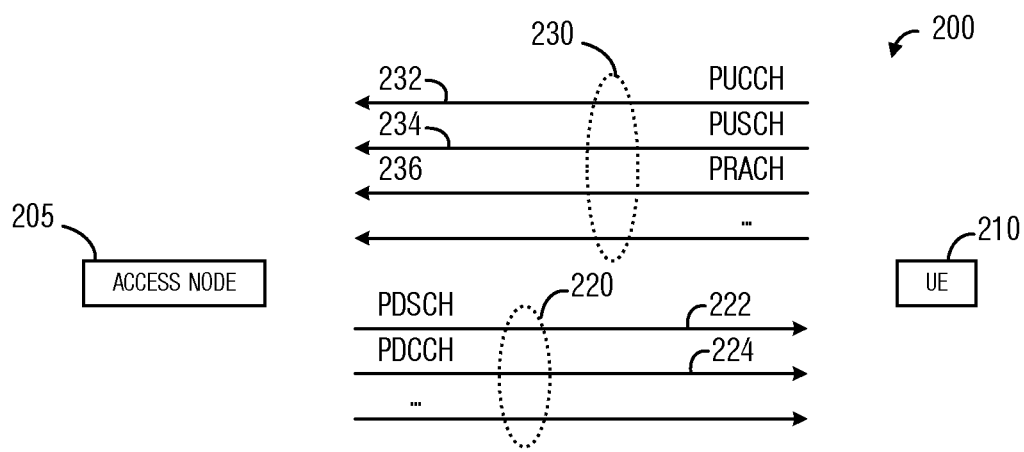
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels may be present in downlink channel 220 or uplink channel 230 but are not shown in FIG. 2.

Figure 3:
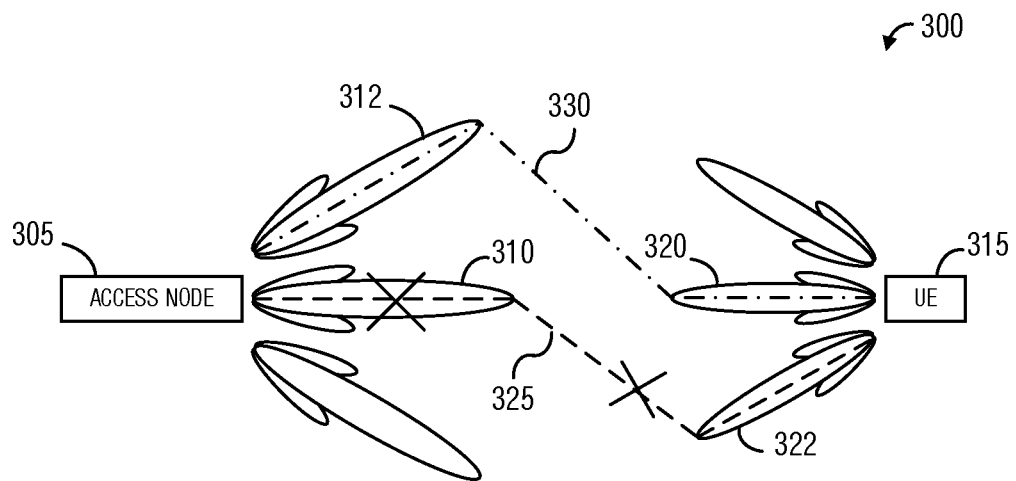
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals, or resources are related in such a way that the two or more reference signals, data signals, or resources may be viewed as possessing similar characteristics, they are said to possess a quasi-collocated (QCL) relationship or that they are QCL'ed. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information-reference signal (CSI-RS) resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

During the standardization activities of 3GPP Fifth Generation (5G) New Radio (NR), a Discontinuous Reception (DRX) operation mode is proposed for saving power consumption at the UE side. DRX operation mode is also sometimes referred to as connected mode discontinuous reception (C-DRX) operation mode. In DRX operation mode, a UE periodically wakes up in DRX-ON periods and performs PDCCH reception, and goes to sleep during DRX-OFF periods if no further action is dictated during the DRX-ON periods.

Figure 4A:
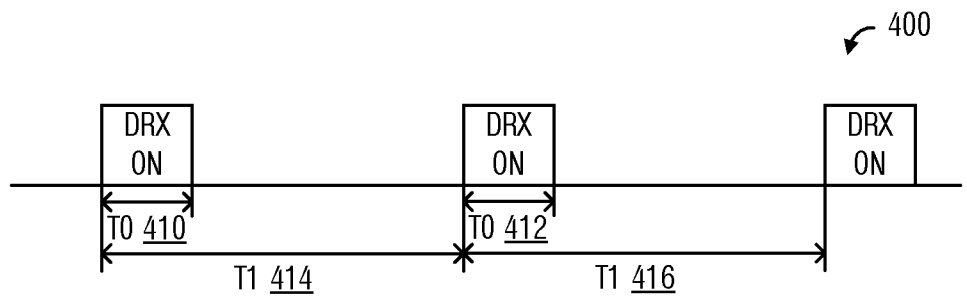
FIG. 4A illustrates a diagram of a first example of DRX operation, where only a Long DRX Cycle (drx-LongCycle) is configured and the serving access node does not send a PDCCH during a DRX-ON duration.

FIG. 4A illustrates a diagram 400 of a first example of DRX operation, where only a Long DRX Cycle (drx-LongCycle) is configured and the serving access node does not send a PDCCH during a DRX-ON duration. A UE switches its state between DRX-ON state and DRX-OFF state based on access node configuration. When the UE is in DRX-ON state, the UE monitors a wireless channel for a frame exchange. However, when the UE is in DRX-OFF state, the UE is not required to monitor the wireless channel based on the assumption that a serving access node will not initiate data transmission during the DRX-OFF state. For each long DRX cycle T1 414 and 416, the UE monitors PDCCH during T0 410 and 412 until a timer drx-onDurationTimer expires. After T0 410 and 412, when drx-onDurationTimer expires, the UE enters the DRX-OFF state again and is does not monitor the wireless channel. Therefore, during long DRX cycle T1 414 and 416, the UE only monitors the wireless channel during T0 410 and 412, which can save power consumption at the UE.

Figure 4B:
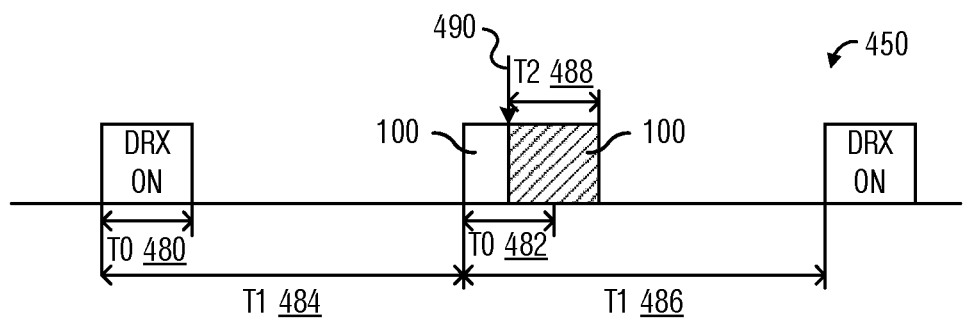
FIG. 4B illustrates a diagram of a second example of DRX operation, where only a long DRX Cycle (drx-LongCycle) is configured and the serving access node sends a PDCCH during a DRX-ON duration.

FIG. 4B illustrates a diagram 450 of a second example of DRX operation, where only a long DRX Cycle (drx-Long-Cycle) is configured and the serving access node sends a PDCCH during a DRX-ON duration. For each long DRX cycle T1 484 and 486, the UE monitors PDCCH during T0 480 and 482 until drx-onDurationTimer expires. If a PDCCH 490 is detected before drx-onDurationTimer expires, the UE monitors the wireless channel further during T2 488 until another timer (drx-Inactivity Timer) expires to check for any follow up DL transmission. When drx-Inactivity Timer expires and there is no follow up data exchange, then the UE enters the DRX-OFF state again and does not monitor the wireless channel.

With the DRX operation mode, a UE can avoid continuous PDCCH monitoring and as a result, save power. However, in 5G NR operation scenarios, especially when high frequency (e.g., above 6 GHz) bands are used for 5G NR communication, the wireless channel or beam can be blocked while the UE is not monitoring the PDCCH (i.e., while the UE is asleep in a DRX-OFF period) due to multiple reasons. For example, if a UE moves or changes its direction while the UE is not monitoring the PDCCH, or an object comes in between the UE and the access node, a transmit or receive beam may not be maintained because the wireless channel has changed.

Figure 5:
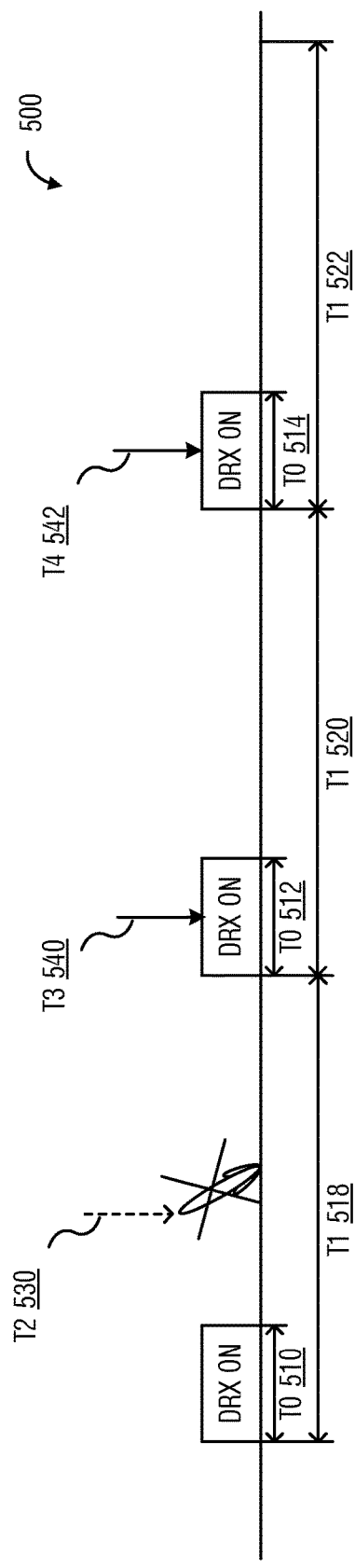
FIG. 5 illustrates a diagram of an example prior art operation of PDCCH beam reception that becomes blocked during DRX operation.

FIG. 5 illustrates a diagram 500 of an example prior art operation of PDCCH beam reception that becomes blocked during DRX operation. In the example operation shown in FIG. 5, only a long DRX Cycle (drx-LongCycle) is configured for a UE, and the UE monitors for a PDCCH during DRX-ON durations or periods. For each DRX cycle T1 518, 520, and 522, the UE monitors for a PDCCH during DRX-ON periods at times T0 510, 512, and 514, and lasting until drx-onDurationTimer expires. As shown in FIG. 5, a beam used for PDCCH reception becomes blocked at time T2 530, while the UE is in the sleep state (in a DRX-OFF period). During the DRX-OFF period, the UE does not identify (or is not able to identify) if the blocking of the beam used for PDCCH reception occurs.

Although the discussion presented herein focusses on the blocking of a single beam, beamformed communications in 5G NR typically uses two beams: a transmit beam at a transmitting device and a receive beam at a receiving device. These two beams are collectively referred to as a BPL. If either of the two beams (or both beams) of the BPL are blocked (or broken), then the BPL is blocked (or broken). Therefore, the discussion of the blocking of a single beam should not be construed as being limiting to either the scope or spirit of the example embodiments.

As the UE does not identify that the beam used for PDCCH reception has been blocked, the UE continues to use the beam for monitoring the PDCCH during upcoming DRX-ON periods at times T0 512 and 514. In this example, a serving access node transmits a series of PDCCHs to the UE at times T3 540 and T4 542, each within DRX-ON periods at times T0 512 and 514, respectively.

However, because of the blockage of the UE's beam used for PDCCH reception occurred at time T2 530, which is before time T0 512, the transmission of the PDCCH from the serving access node at times T3 540 and T4 542 are highly likely to be undetectable and undecodeable by the UE because the UE continues to use the same beam for PDCCH monitoring during DRX-ON periods at times T0 510, 512, and 514, even after the beam has been blocked.

Because the UE does not successfully decode any PDCCH destined for the UE during DRX-ON periods at times T0 510, 512, and 514, the UE goes back to the DRX-OFF state and stops monitoring the PDCCH. In this case, due to an instance of the blocking of the beam used for PDCCH reception, the UE does not receive any PDCCH for the entire time when the UE is in DRX operation, as shown in FIG. 5.

When a serving access node and a UE are operating in DRX mode, frame exchanges between the serving access node and the UE occur only within a DRX-ON period. No frame exchange is expected during a DRX-OFF period. Moreover in a normal operation scenario, the time duration of a DRX-OFF period is much longer than the time duration of a DRX-ON period to save more power at the UE. Therefore, if the blocking of the UE's beam used for PDCCH reception occurs, the impact of unsuccessfully receiving the PDCCH sent from the serving access node has a lasting impact on the performance of the UE, and thus, may result in radio link failure.

As such it is necessary for the UE to be able to confirm whether a beam used for detecting the PDCCH is still operable or not. In order to maximize DRX operating mode performance, it may be imperative that the UE is able to confirm the state of the beam as quickly as possible when it enters a DRX-ON period.

A beam quality reference signal (BQRS) is used to assist in the confirmation of the quality of a beam used in detecting a downlink PDCCH. The BQRS may be transmitted by the access node. A UE may detect the BQRS to ensure that the beam used in detecting the downlink PDCCH is intact. As an example, if the BQRS is detectable by the UE (and optionally with a beam quality that meets a quality threshold) then the beam may be deemed as having met a criterion for successful signal reception. As another example, if the BQRS is not detectable by the UE (and optionally with a beam quality that does not meet a quality threshold) then the beam may be deemed as having not met a criterion for successful signal reception.

The BQRS is a dedicated reference signal for use in confirming the quality of the beam used in detecting the downlink PDCCH. However, other reference signals, such as a discontinuous reference signal (DRS), a synchronization signal block (SSB), a channel state information reference signal (CSI-RS), a demodulation reference signal (DMRS), and so on, may be used as a BQRS. The BQRS may be a cell-specific reference signal or a UE-specific reference signal. In the situation where the BQRS is a cell-specific reference signal, more than one UE may monitor the same BQRS to confirm if the quality of its own beam meets the criterion for successful signal reception. The BQRS has a spatial QCL relationship with the PDCCH of the UE or another reference signal (such as a DMRS of the PDCCH of the UE). In other words, the BQRS and the PDCCH (or the DMRS of the PDCCH) are spatially QCL'ed. The PDCCH referred to herein is the PDCCH that the UE is going to monitor during the DRX-ON period. This ensures that by measuring the BQRS quality, the UE is able to infer the PDCCH reception quality.

Configuration information about the BQRS (or in general, a BQRS mode) is provided to the UE. The configuration information may be provided to the UE by the access node using higher layer signal, such as radio resource control (RRC) signaling, media access control (MAC) control element (CE) Messages, or downlink control information (DCI) messages. The configuration information may include time information, frequency information, or both time and frequency information, to inform the UE where to detect the BQRS when the UE wakes up. Alternatively, the configuration of the BQRS is specified by a technical standard or an operator of the communications system. In such a situation, the UE is programmed with the configuration information or is provided the configuration information by the communications system, such as during initial attachment or during a handover, for example.

Figure 6:
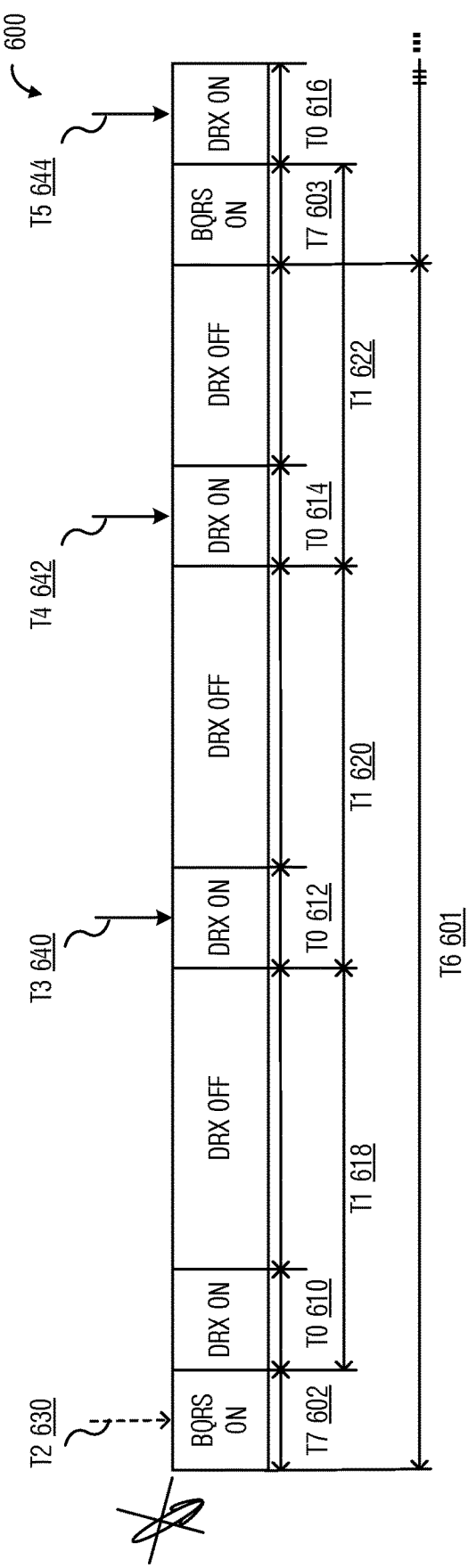
FIG. 6 illustrates a diagram highlighting the use of a BQRS to ensure that a beam between access node and UE is intact.

FIG. 6 illustrates a diagram 600 highlighting the use of a BQRS to ensure that a beam between access node and UE is intact. The BQRS may be sent in a BQRS-ON period (T7 602 and 603, for example). During the BQRS-ON period, the UE is expected to wake up and monitor a reference beam quality of the BQRS. Examples of the reference beam quality include received signal power, reference signal received power (RSRP), reference signal received quality (RSRQ), signal to noise ratio (SNR), signal plus interference to noise ratio (SINR), block error rate (BLER), and so on. As shown in FIG. 6, the BQRS has a recurring periodicity of T6 601. However, the BQRS may be aperiodic. The position of each BQRS-ON period (e.g., T7 602 and 603), as well as associated starting and stopping positions, duration, and periodicity, of the BQRS may be configured by the access node. The BQRS-ON periods may or may not occur immediately before or after DRX-ON (such as T0 610, 612, 614, and 616) or DRX-OFF periods. Additionally, the BQRS-ON periods and the DRX-ON periods may overlap. Furthermore, a BQRS-ON period may be fully contained within a DRX-ON period or a DRX-ON period may be fully contained within a BQRS-ON period. Also, a BQRS-ON period and a DRX-ON period may be disjoint, and share no time in common. Also, one BQRS-ON period T7 602 may be followed by one (not illustrated in FIG. 6) or several (illustrated in FIG. 6) DRX-ON periods (such as T0 610, 612, and 614) until the next BQRS-ON period T7 603.

In general, a BQRS (or a BQRS-ON period) is associated with one or more DRX-ON periods. A BQRS (or a BQRS-ON period) is associated with the one or more DRX-ON periods that occur between consecutive BQRSs (or BQRS-ON periods). As an example, DRX-ON periods T0 610, 612, and 614, are associated with BQRS-ON period at time T7 602 or the BQRS transmitted therein.

The specifics of the BQRS-ON period (e.g., starting or ending positions in time or frequency, and duration) may be different from the specifics of the DRX-ON period, as illustrated in FIG. 6. The BQRS recurring periodicity may be different from the DRX recurring periodicity, as illustrated in FIG. 6, where three DRX periods T1 618, 620, 622 occur within a single BQRS period T6 601. However, they may be the same. Within each BQRS-ON period, there may be one or multiple BQRS configured.

The BQRS signal itself may be configured as having a QCL relationship with the PDCCH beam or a DMRS of the PDCCH beam, while the PDCCH for a particular UE may or may not occur within a particular DRX-ON period associated with the BQRS. The BQRS signal, on the other hand, will occur within a BQRS-ON period, although it is not necessary that the BQRS signal is present in every BQRS-ON period.

UEs measure the BQRS during a BQRS-ON period. As a result, UE has knowledge if the beam used for PDCCH detection is intact. As an example, the UE has knowledge of the beam quality (e.g., RSRP, RSRQ, BLER, SINR, SNR, received signal power, and so forth) meeting a specified threshold. The threshold may be specified by a technical standard, set by an operator of the communications system, or determined by communications devices through collaboration. UE also monitors for potential PDCCH reception during DRX-ON period or periods associated with the BQRS or BQRS-ON period. Depending on the BQRS-ON monitoring results and DRX-ON monitoring results, there may be four possibilities, which can be categorized into two scenarios.

Scenario 1: If the last m>=1 (including the current) BQRS-ON periods yielded a beam quality of a beam used for BQRS detection that is consistently worse than a first threshold, AND that the latest n>=1 (including the current) DRX-ON periods yielded no PDCCH reception as a result of PDCCH detections, the UE may abort reception of DRX-ON periods afterwards. However, the UE may still monitor BQRS-ON periods afterwards. Once a BQRS in a new BQRS-ON period is received with a beam quality that meets a second threshold, the UE may continue (or resume) to perform PDCCH detections during the DRX-ON periods associated with the BQRS again. The first and second thresholds may be the same or they may be different. The UE still sleeps during the DRX-OFF periods afterwards. In an embodiment, the UE aborting reception means that UE breaks out of the DRX mode entirely and enters non-DRX mode for recovery, possibly by performing a link recovery procedure or beam failure recovery procedure as defined in 3GPP specification. Non-DRX mode may be referred to as non-power saving mode. In another embodiment, the UE simply sleeps during the DRX-ON and may resume DRX mode at a later point, e.g., when BQRS is received again.

Scenario 2: otherwise. This means that during the last m>=1 BQRS-ON periods, at least one beam quality of a beam used for BQRS detection is better than a threshold, OR that during the last n>=1 DRX-ON periods, at least one PDCCH is received successfully, OR both conditions are met. In this scenario, the UE should continue to monitor BQRS-ON periods and DRX-ON periods as usual. The UE should still sleep during the DRX-OFF periods afterwards.

In the above scenarios, the values m and n may be greater than or equal to 1. The values m and n may be the same or they may be different from each other.

Overall, from the access node side, the access node configures BQRS-ON periods in addition to DRX-ON or DRX-OFF periods. From UE side, the UE monitors BQRS-ON periods in addition to DRX-ON periods. UE does not need to monitor DRX-OFF periods. Depending on the results of monitoring BQRS-ON and DRX-ON periods in the past, the UE behavior for the upcoming BQRS-ON or DRX-ON periods may be impacted.

Although the BQRS transmitted by an access node enables a UE to rapidly determine the quality of the beam used in control channel (e.g., PDCCH) reception, the DRX mode as specified in 5G NR does not specify how the access node will be able to determine the quality of the beam used in control channel transmission or how the UE will be able to communicate its knowledge to the access node.

According to an example embodiment, discontinuous transmission (DTX)-ON periods are configured to allow UEs to transmit signals or report information while in DTX operation. The DTX-ON periods are configured in addition to DRX-ON periods, which enables UEs to detect and receive control channels, such as PDCCHs. During a DTX-ON period, UEs can transmit signals or report information to an access node to assist the access node in confirming validity of PDCCH beams and associated transmissions. At an access node, the access node configures DTX-ON periods, as well as DRX-ON periods and sends the configurations to the UE. As an example, the configuration includes a duration of the DTX-ON period (if the DTX-ON periods have a single duration) or durations of the DTX-ON periods (if different DTX-ON period durations are supported). The configuration also includes periodicity information for the DTX-ON periods, as well as the DRX periods, DRX-ON period durations, and DRX durations (the duration of a single DRX cycle, for example). At a UE, the UE reports results of DRX-ON operation. If BQRS-ON periods are configured, the UE also reports results of BQRS operation. In an embodiment, the DTX-ON periods are configured in addition to BQRSs or DRS-ON periods.

FIG. 7 illustrates a diagram 700 highlight DRX operation with DTX-ON periods. As shown in FIG. 7, a multiple DTX-ON periods (such as DTX-ON periods 703, 706, 713, 716) are configured with a periodicity 730. DTX operation allows a UE to send an uplink signal to the access node. With DTX operation implemented, the UE is allowed to transmit only during DTX-ON periods, and not allowed to do so otherwise (e.g., during DRX-ON periods (such as DRX-ON periods 702, 705, 712, and 716), DRX-OFF periods (such as DRX-OFF periods 704, 707, 714, and 717), and optionally, BQRS-ON periods (including BQRS-ON periods 701 and 711 (if BQRS-ON periods are present)). DRX-ON, DTX-ON, and BQRS-ON (if present) periods may have different recurring periodicities, such as periods 720, 730, and 740.

From the point of view of an access node, the access node configures starting positions, ending positions, or duration of each DTX-ON period, and possibly the recurring periodicity of the DTX-ON periods. Information regarding the configuration may be sent to the UE using RRC messages, or MAC-CE messages, or DCI messages.

In an embodiment, when a UE has a transmission to make during a DTX-ON period, an uplink channel, such as a PUCCH or PUSCH, is used. This requires the access node to allocate PUCCH or PUSCH resources in advance, e.g., shortly before or after configuring the DTX-ON periods. If PUCCH or PUSCH resources are assigned, different formats may be used. In an embodiment, a signaling format such as CSI feedback may be used in the uplink transmission made by the UE. In another embodiment, an uplink signaling format such as link quality confirmation may be introduced. The signaling of the link quality confirmation format may signal whether the link quality of the beam associated with the PDCCH meets a specified threshold or not.

In an embodiment, when a UE has a transmission to make during a DTX-ON period, a contention-free random access channel is used. In other words, the UE transmits a PRACH. The PRACH may be used to trigger beam management, such as a beam recovery procedure, re-training, and so on. The transmission of the PRACH to trigger beam management may be analogous to beam failure recovery in a non-DRX mode, where the access node knows that the beam quality is poor (i.e., the beam quality is below a specified threshold) if the access node receives a contention-free PRACH from a UE. This embodiment may require the access node to allocate random access channel resources in advance, e.g., shortly before or after configuring the DTX-ON periods. The random access channel resources may include time, frequency, and sequence, or code resources to be used when UE performs the random access by transmitting on the contention-free random access channel.

In an embodiment, when a UE has a transmission to make during a DTX-ON period, a contention-based random access channel is used. In other words, the UE transmits a PRACH. The PRACH may be used to trigger beam management, such as a beam recovery procedure, re-training, and so on. The transmission of the PRACH to trigger beam management may be analogous to beam failure recovery in a non-DRX mode, where the access node knows that the beam quality is poor (i.e., the beam quality is below a specified threshold) if the access node receives a contention-based PRACH from a UE. This embodiment may require the access node to allocate random access channel resources in advance, e.g., shortly before or after configuring the DTX-ON periods. The random access channel resources may include time, frequency, and sequence, or code resources to be used when UE performs the random access by transmitting on the contention-based random access channel.

In an embodiment, when a UE has a transmission to make during a DTX-ON period, the UE reports to the access node a quality measurement of a reference signal, such as a BQRS. For example, the UE may report to the access node that the beam quality of the BQRS is poor (i.e., the quality measurement is worse than a first specified threshold or does not meet a first beam quality criterion). As another example, the UE may report to access node that the beam quality of the BQRS is good (i.e., the quality measurement is better than a second specified threshold or meets a second beam quality criterion).

In an embodiment, the beam quality reported during a DTX-ON period is a report of the beam quality as measured by the UE. As an example, the UE measures the beam quality of a received signal, such as a BQRS, a PDCCH, and so on, and reports the beam quality. In an embodiment, the beam quality reported during a DTX-ON period is the beam quality of the received signal. In this situation, the beam quality reported is the beam quality during the DRX-ON period. In an embodiment, the beam quality reported during a DTX-ON period is a prediction or estimate of a beam quality for a future received signal, such as a BQRS, a PDCCH, and so on, received at a future DRX-ON period. In other words, the beam quality for a current DRX-ON period serves as a prediction or estimate for the beam quality during a future DRX-ON period. In general, the greater the amount of time between the current DRX-ON period and the future DRX-ON period, the less accurate the prediction or estimate. In an embodiment, the prediction or estimate of the beam quality is an adjusted version of the beam quality of a current DRX-ON period. As an example, the beam quality of the current DRX-ON period is adjusted using historical information or data, including geographic data, time of day data (which may convey busy or idle periods, for example), or day of month data (which may convey busy or idle days, such as weekends, holidays, special events, etc., for example).

In an embodiment, when a UE has a transmission to make during a DTX-ON period, the UE reports to the access node recent PDCCH receiving results. For example, the UE may report to the access node a count of PDCCHs that have been successfully received since a specified time or milestone, e.g., a last DTX-ON period, a start position that the access node and UE have agreed on, a previous report, and so on.

In an embodiment, when a UE has a transmission to make during a DTX-ON period, the UE reports to the access node to trigger a beam management procedure, a beam failure recovery procedure, a handover procedure, or any other procedure that is typically not involved in DRX behavior.

In an embodiment, when a UE has a transmission to make during a DTX-ON period, during a remaining time until the end of an original DRX-ON period or DRX-OFF period, the UE chooses to sleep for the entirety of the remaining time. As a result, the access node does not need to send a PDCCH to the UE during this DRX cycle. Alternatively, during the remaining time until the end of the original DRX-ON period or DRX-OFF period, the UE may choose to terminate the DRX cycle early and return to normal mode (i.e., exit the DRX mode completely). Upon receiving the transmission, the access node may also terminate the DRX cycle (for this particular UE) and enters a normal mode (for this particular UE).

In an embodiment, when a UE has a transmission to make during a DTX-ON period, the UE expects a certain response from the access node. Depending on the content of the response from the access node, the UE may sleep for the entirety of the DRX cycle, or terminate the DRX cycle early and return to normal mode (i.e., exit the DRX mode completely).

In an embodiment, when a UE has a transmission to make during a DTX-ON period, the UE transmits a sounding reference signal (SRS). This may be based on the access node's a priori configuration of the DTX-ON periods to support SRS transmission by the UE. In other words, the DTX-ON periods are configured by the access node to allow the UE to transmit SRSs. As a result, the access node monitors DTX-ON periods for SRS reception purposes. If a SRS is received with a quality measure that meets a specified threshold, the access node may infer that the beam quality is still good (the beam quality meets a beam quality criterion, for example), and no change is needed. If a SRS is not received with a quality measure that meets a specified threshold, the access node infers that the beam quality is not good (the beam quality does not meet a beam quality criterion, for example) and may initiate a beam recovery procedure (which is beyond of the scope of this discussion). In this case, the UE may need to use the same transmit beam to send the SRS (or some other signal in the DTX-ON period) as the receive beam used to receive a signal in the DRX-ON period. In other words, the transmit beam used by the UE during an associated DTX-ON period and the receive beam used by the UE during the associated DRX-ON holds beam correspondence.

In communications systems that are operating at higher frequencies, such as mmWave communications systems, communications devices generally have a large number of transmit or receive antennas that share a smaller number of radio frequency (RF) chains. From the perspective of a communications device, the beamformed transmit and receive beams should have the same (or substantially the same) beam pattern (in terms of peak or non-peak beam direction, peak or non-peak beam gain, peak or non-peak beam width, and so on, for example) in the spatial domain. This means that for each beamformed beam, the beam response on all directions should be the same (or substantially the same) from the point of view of the transmitter and the receiver. This is known as the beam correspondence condition, and when the beam correspondence condition is met, beam correspondence is achieved. As an example a receive beam and a transmit beam that make up a BPL at a communications device typically hold beam correspondence. The beams that meet the beam correspondence condition are said to be beam correspondent.

In general, a DRX-ON period is associated with a first DTX-ON period if the DRX-ON period occurs between the first DTX-ON period and a consecutive DTX-ON period. Alternatively, a DRX-ON period is associated with a first DTX-ON period if the DRX-ON period occurs with a specified time or number of DRX cycles after the first DTX-ON period.

In an embodiment, when a UE has a transmission to make during a DTX-ON period, the UE transmits a SRS (or some other signal) only if it has recently confirmed that the beam quality meets a specified threshold. In other words, the UE has high probability that the transmission will be received before the UE makes the transmission. As an example, the UE does not make a transmission unless it has recently received a PDCCH from the access node, and the UE makes the transmission using a transmit beam that is beam correspondent with the receive beam used to receive the PDCCH. As used here, the term recent may be defined as: a specified amount of time since the PDCCH has been received; the DTX-ON period is associated with a DRX-ON period during which the PDCCH was received; the DTX-ON period occurs within a specified number of DRX cycles from the DRX-ON period during which the PDCCH was received; and so on. Additionally, the transmission of the SRS (or the signal) also serves as an acknowledgement to the access node for the reception of the PDCCH. In an embodiment, the transmission of the SRS is dependent upon the decoding result of the PDCCH. As an example, if the decoding of the PDCCH is successful (i.e., the UE was able to decode the PDCCH and process the information contained therein), the UE transmits the SRS. In this configuration, the transmission of the SRS conveys good beam quality information (as seen in the successful decoding of the PDCCH) to the access node. As an example, if the decoding of the PDCCH is unsuccessful (i.e., the UE was not able to decode the PDCCH or could not process the information contained therein), the UE transmits the SRS. In this configuration, the transmission of the SRS conveys poor beam quality information (as seen in the unsuccessful decoding of the PDCCH) to the access node.

In an embodiment, the DTX-ON period is also used for grant-free transmissions. The DTX-ON period may be present, independent of the presence or absence of a BQRS. FIG. 8 illustrates a diagram 800 highlighting the use of DTX-ON periods without the presence of BQRSs. As shown in FIG. 8, multiple DTX-ON periods (such as DTX-ON periods 803, 806, 813, and 816) are configured with a periodicity 830, multiple DRX-ON periods (such as DRX-ON periods 802, 805, 812, and 815) are configured with a periodicity 840, and multiple DRX-OFF periods (such as DRX-OFF periods 804, 807, 814, and 817). The periodicity of DTX-ON periods (from one DTX-ON period to a subsequent DTX ON period) may be different from periodicity of DRX-ON periods (from one DRX-ON period to a subsequent DRX-ON period).

Beam failure recovery typically occurs in non-power save mode and involves the UE monitoring a reference signal (e.g., a beam failure reference signal (BFRS)) to detect beam failure instances, and if multiple beam failure instances occur within a specified period of time, the UE declares a radio link failure. As an example, if the beam quality of the reference signal is below a specified threshold a specified number of times within the specified period of time, the UE may trigger a beam failure recovery procedure.

Figure 9A:
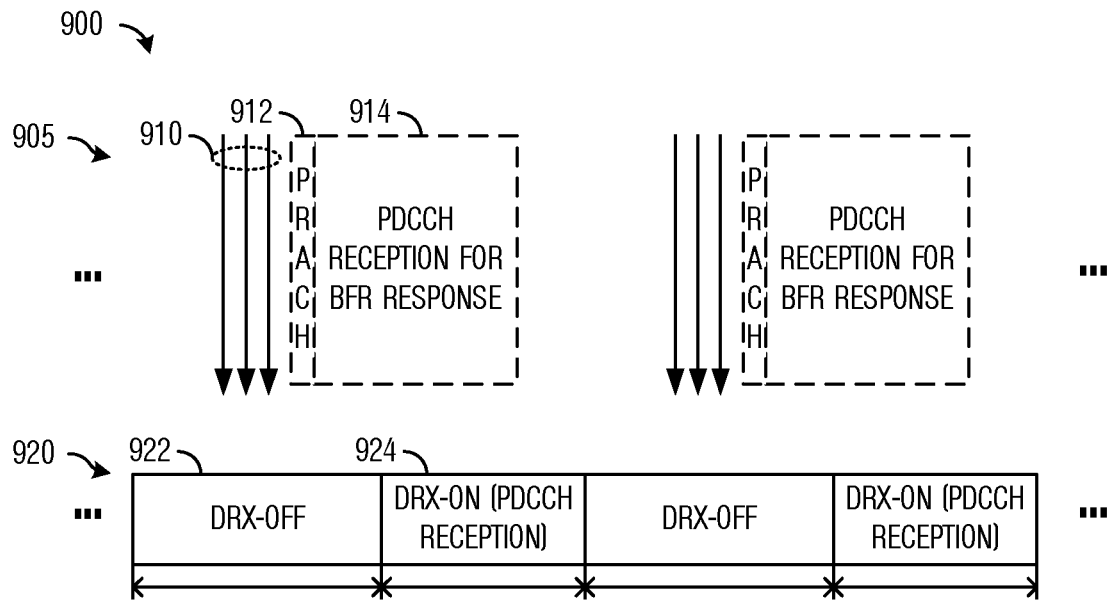
FIG. 9A illustrates a diagram highlighting beam monitoring and DRX modes according to example embodiments described herein.

FIG. 9A illustrates a diagram 900 highlighting beam monitoring and DRX modes. A first sequence 905 represents operations occurring in beam monitoring. In beam monitoring, the UE monitors reference signals (such as BFRSs) 910 and makes signal measurements in accordance with the reference signals. If the beam quality does not meet a specified threshold, the UE may send a PRACH 912 to the access node to trigger a beam failure recovery procedure, for example. The UE may perform PDCCH monitoring 914 for a beam failure recovery response from the access node.

A second sequence 920 represents operations occurring during DRX mode. While in DRX mode, the UE may be in a sleep state during a DRX-OFF period (such as DRX-OFF period 922) and an awake state during a DRX-ON period (such as DRX-ON period 924) to monitor for a PDCCH. DRX mode operation and beam monitoring may be incompatible due to mis-alignment of the different stages of beam monitoring and beam failure recovery and DRX mode.

According to an example embodiment, the alignment of the monitoring of a control channel for the purpose of beam failure recovery with the monitoring of a control channel during DRX mode is provided. In an embodiment, the possibly different stages of beam monitoring are aligned with the stages of DRX mode to enable a UE operating in the DRX mode to perform both functions at the same time. As discussed previously beam monitoring comprises the monitoring of reference signals for beam failure detection, as well as PDCCH monitoring for a beam failure recovery response, which requires the UE to be in the awake state with its receiver on. Furthermore, the transmission of the PRACH requires the UE to have its transmitter on to transmit the PRACH. As an example, the UE can monitor reference signals, as well as PDCCH monitoring for a beam failure recovery response (if needed) during a BQRS-ON period or a DRX-ON period, and transmit a PRACH (if needed) during a DTX-ON period. The periodic nature of beam monitoring enables a good fit with the periodic DRX mode operations.

Figure 9B:
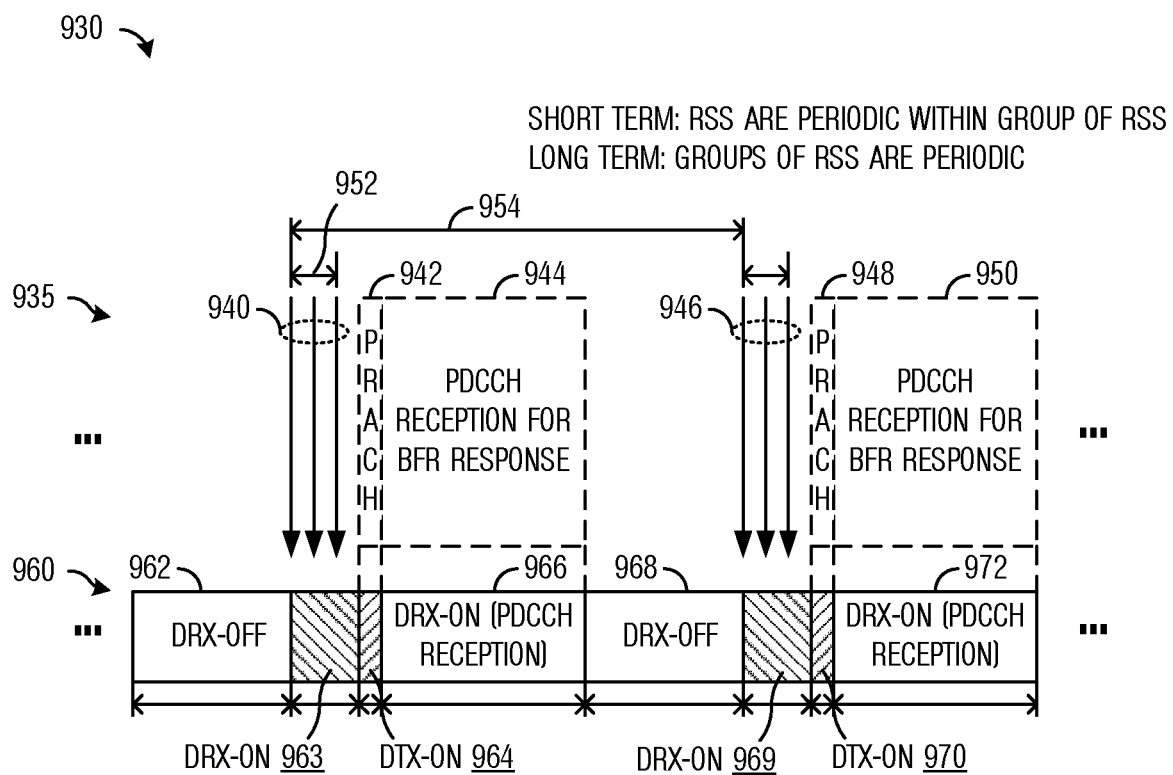
FIG. 9B illustrates a diagram highlighting a first example alignment of beam monitoring and DRX modes according to example embodiments described herein.

FIG. 9B illustrates a diagram 930 highlighting a first example alignment of beam monitoring and DRX modes. A first sequence 935 represents operations occurring in beam monitoring. In beam monitoring, the UE monitors reference signals (such as BFRS) 940 and makes signal measurements in accordance with the reference signals. If the beam quality does not meet a specified threshold, the UE may send a PRACH 942 to the access node to trigger a beam failure recovery procedure. The UE may perform PDCCH monitoring 944 for a beam failure recovery response (BFRP) from the access node. A time interval when the UE is expecting a BFRP from the access node is referred to as a BFRP window. The beam monitoring is periodic in nature and UE subsequently monitors reference signals 946, may transmit a PRACH 948, and may perform PDCCH monitoring 950. The reference signals are individually periodic within an interval 952, with the reference signals, as a group, occur periodically with period 954.

A second sequence 960 represents operations occurring during DRX mode that is aligned with UE operations for beam monitoring. While in DRX mode, the UE may be in a sleep state during a DRX-OFF period (such as DRX-OFF period 962 or 968) and an awake state otherwise. While in the awake state, the UE may monitor reference signals in a DRX-ON period 963 or a BQRS-ON period, transmit a PRACH (if needed) in a DTX-ON period 964, and perform PDCCH reception (if needed) during DRX-ON period 966. The periodic nature of DRX mode has the UE repeating the operations in a DRX-OFF period 968, a DRX-ON period 969 (or BQRS-ON period), a DTX-ON period 970, and a DRX-ON period 972. Although shown in FIG. 9B as being perfectly aligned (at both the starting time and the ending time), the different aspects of beam failure monitoring may not be perfectly aligned with the DRX mode. As an example, DRX-ON period 963 may have the same starting or ending time as the monitoring of control channels or reference signals, but the ending or starting time may not be aligned. As another example, DRX-ON period 963 may have the same starting and ending times as the monitoring of reference signals. As another example, DRX-ON period 963 may be a subset or a superset of the duration of the monitoring of control channels or reference signals. The durations or alignments of the other periods of the DRX mode may also differ from the other aspects of beam failure monitoring in a similar or different fashion as DRX-ON period 963.

Figure 9C:
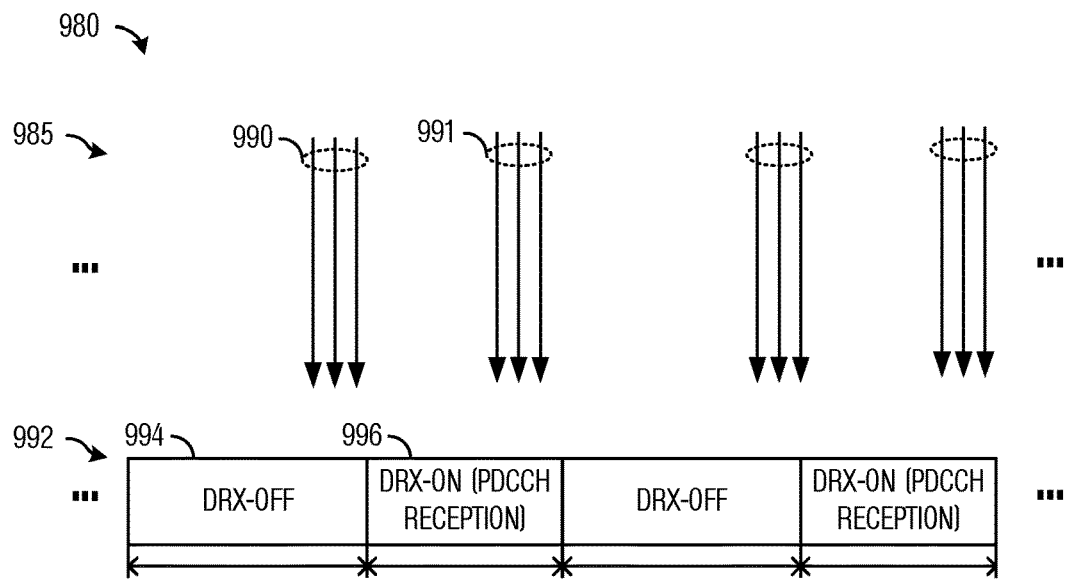
FIG. 9C illustrates a diagram highlighting a second example alignment of beam monitoring and DRX modes according to example embodiments described herein.

FIG. 9C illustrates a diagram 980 highlighting a second example alignment of beam monitoring and DRX modes. A first sequence 985 represents operations occurring in beam monitoring, and a second sequence 992 represents operations occurring during DRX mode. In beam monitoring, the UE monitors reference signals (such as BFRS) 990 and 991 and makes signal measurements in accordance with the reference signals. For example, if the beam quality does not meet a specified threshold, the UE can infer that the beam quality is not sufficiently good. Similarly, if the beam quality does meet a specified threshold, the UE can infer that the beam quality is sufficiently good. The specified thresholds may be the same or they may be different. The reference signals 990 may occur before a DRX-ON period 996, in what is formerly part of DRX-OFF period 994, for example. The duration that corresponds to reference signals 990 would be another DRX-ON period or a BQRS-ON period, or some other period where the receiver of the UE is on to receive signals. Alternatively, the reference signals 991 may occur somewhere in the middle, or towards the end, of DRX-ON period 996. If the beam quality of reference signals 990 is sufficiently good, UE may decide to continue with PDCCH monitoring in an upcoming DRX-ON period, such as DRX-ON period 996; while if the beam quality of reference signals 990 is not sufficiently good, UE may decide to skip PDCCH monitoring in the upcoming DRX-ON period, such as DRX-ON period 996. PDCCH monitoring is also commonly referred to as PDCCH searching. If the beam quality from 991 is sufficiently good, UE may decide to put an early stop of the PDCCH monitoring within the remainder of DRX-ON period 996. If the beam quality from 991 is not sufficiently good (or not detectable), UE may decide to continue PDCCH monitoring within the remainder of DRX-ON period 996. Reference signals 990 and 991 may both be present, or only one of them may be present.

Figure 10A:
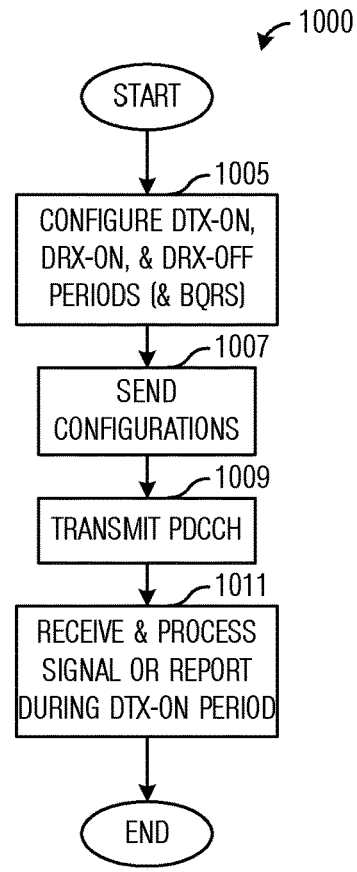
FIG. 10A illustrates a flow diagram of example operations occurring in an access node receiving a signal from a UE during DTX mode according to example embodiments described herein.

FIG. 10A illustrates a flow diagram of example operations 1000 occurring in an access node receiving a signal from a UE during DTX mode. Operations 1000 may be indicative of operations occurring in an access node as the access node receives a signal from a UE during DTX mode. The signal provides information about the beam quality of a beam used to transmit a control channel (e.g., a PDCCH) to the UE.

Operations 1000 begin with the access node configuring DTX-ON periods and DRX mode (including DRX-OFF or DRX-ON periods) (block 1005). The configuration of the periods may include specifying start times, durations, stop times, periods, and so on. Optionally, the access node also configures a BQRS or BQRS-ON periods. The configuration of the periods is such that the periods are aligned with the timing of the monitoring of a control channel for the purpose of beam failure recovery. The access node sends information related to the configurations (block 1007). The access node sends PDCCHs during DRX-ON periods (block 1009). The access node receives and processes a signal or report during a DTX-ON period (block 1011). The signal or report is received from a UE. The access node processes the signal or report and responds accordingly.

FIGS. 10B-10D illustrate different example scenarios for signal or report receiving and processing at an access node. As shown in FIG. 10B, the signal received by the access node is in the form of a PUSCH or a PUCCH (block 1025). The access node determines the beam quality in accordance with the PUSCH or PUCCH (block 1027). As an example, the PUSCH or PUCCH may include a report of the beam quality, as measured by the UE. As another example, the access node determines the beam quality from a measurement of the PUSCH or PUCCH. The access node responds in accordance with the beam quality (block 1029). Blocks 1025, 1027, and 1029 may be collectively referred to as receiving and processing a signal or report (block 1020).

As shown in FIG. 10C, the signal received by the access node is in the form of a PRACH (block 1045). The PRACH triggers a beam management procedure (block 1047). Examples of a beam management procedure include a beam recovery procedure, re-training, and so on. Blocks 1045 and 1047 may be collectively referred to as receiving and processing a signal or report (block 1040). As shown in FIG. 10D, the signal received by the access node is in the form of a SRS (block 1065). The access node determines the beam quality in accordance with the SRS (block 1067). As an example, the access node determines the beam quality from a measurement of the SRS. The access node responds in accordance with the beam quality (block 1069). Blocks 1065, 1067, and 1069 may be collectively referred to as receiving and processing a signal or report (block 1060).

Figure 11A:
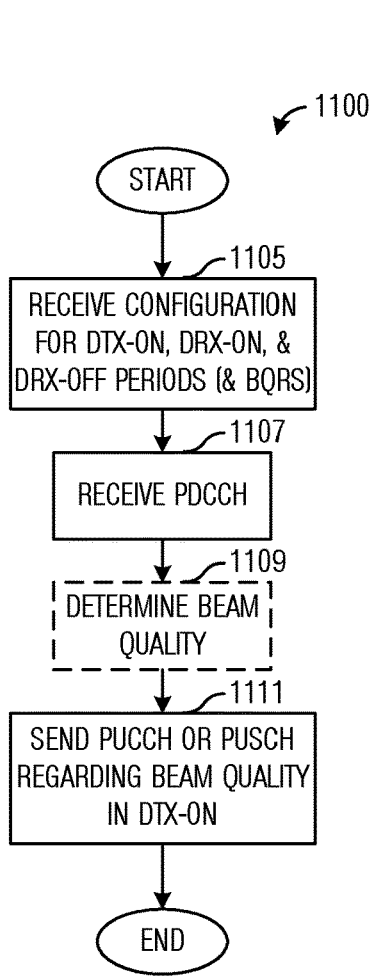
FIG. 11A illustrates a flow diagram of example operations occurring in a UE highlighting a situation where the UE transmits a PUCCH or a PUSCH as a signal in a DTX-ON period according to example embodiments described herein.

FIG. 11A illustrates a flow diagram of example operations 1100 occurring in a UE highlighting a situation where the UE transmits a PUCCH or a PUSCH as a signal in a DTX-ON period. Operations 1100 may be indicative of operations occurring in a UE as the UE transmits a PUSCH or a PUCCH as a signal in a DTX-ON period.

Operations 1100 begin with the UE receiving configuration information for DTX-ON periods and DRX mode (including DRX-OFF or DRX-ON periods) (block 1105). The configuration of the periods may include specifying start times, durations, stop times, periods, and so on. Optionally, the access node also configures a BQRS or BQRS-ON periods. The configuration of the periods is such that the periods are aligned with the timing of the monitoring of a control channel for the purpose of beam failure recovery. The configuration information may be received from an access node serving the UE. The UE receives a PDCCH (block 1107). The UE may determine a beam quality of a beam between the access node and the UE (block 1109). As an example, the UE measures reference signals transmitted by the access node to determine the beam quality. As another example, the UE measures transmissions made by the access node to determine the beam quality. As yet another example, the UE measures control information transmissions made by the access node to determine the beam quality. The UE sends the PUSCH or PUCCH in a DTX-ON period (block 1111). The PUSCH or PUCCH may be transmitted to the access node. If the UE determined the beam quality in block 1109, the PUSCH or PUCCH may include the beam quality (or an indicator thereof) determined by the UE. The beam quality or the indicator thereof may be included in a report included in the PUSCH or PUCCH. If the UE did not determine the beam quality in block 1109, the PUSCH or PUCCH may be used by the access node to determine the beam quality, based on measurements of the PUSCH or PUCCH, for example.

Figure 11B:
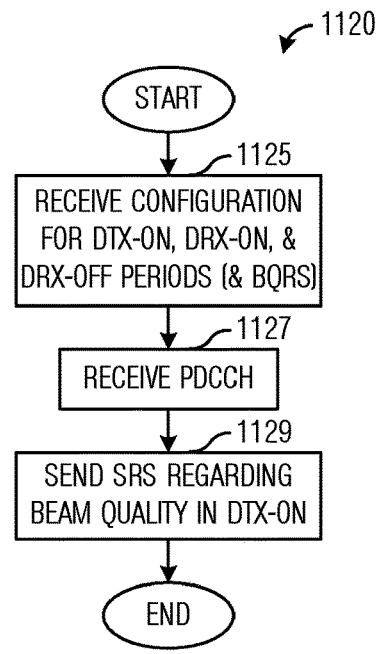
FIG. 11B illustrates a flow diagram of example operations occurring in a UE highlighting a situation where the UE transmits a SRS as a signal in a DTX-ON period according to example embodiments described herein.

FIG. 11B illustrates a flow diagram of example operations 1120 occurring in a UE highlighting a situation where the UE transmits a SRS as a signal in a DTX-ON period. Operations 1120 may be indicative of operations occurring in a UE as the UE transmits a SRS as a signal in a DTX-ON period.

Operations 1120 begin with the UE receiving configuration information for DTX-ON periods and DRX mode (including DRX-OFF or DRX-ON periods) (block 1125). The configuration of the periods may include specifying start times, durations, stop times, periods, and so on. Optionally, the access node also configures a BQRS or BQRS-ON periods. The configuration of the periods is such that the periods are aligned with the timing of the monitoring of a control channel for the purpose of beam failure recovery. The configuration information may be received from an access node serving the UE. The UE receives a PDCCH (block 1127). The UE sends a SRS in a DTX-ON period (block 1129). The SRS may be used by the access node to determine the beam quality of the beam between the access node and the UE.

Figure 11C:
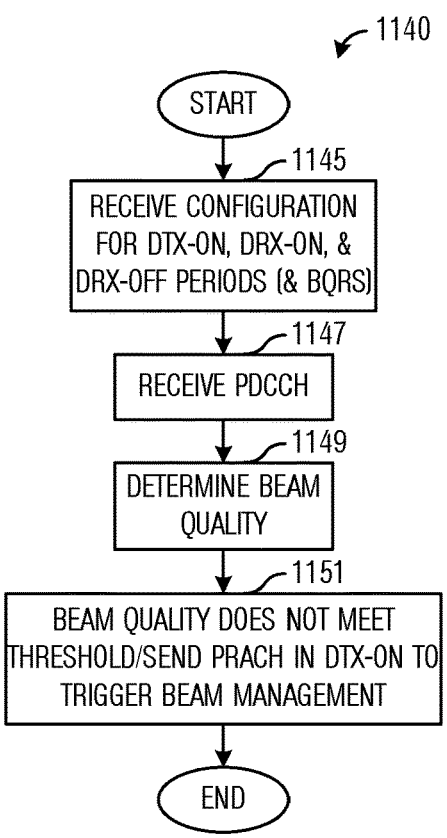
FIG. 11C illustrates a flow diagram of example operations occurring in a UE highlighting a situation where the UE transmits a PRACH in a DTX-ON period according to example embodiments described herein.

FIG. 11C illustrates a flow diagram of example operations 1140 occurring in a UE highlighting a situation where the UE transmits a PRACH in a DTX-ON period. Operations 1140 may be indicative of operations occurring in a UE as the UE transmits a PRACH in a DTX-ON period.

Operations 1140 begin with the UE receiving configuration information for DTX-ON periods and DRX mode (including DRX-OFF or DRX-ON periods) (block 1145). The configuration of the periods may include specifying start times, durations, stop times, periods, and so on. Optionally, the access node also configures a BQRS or BQRS-ON periods. The configuration of the periods is such that the periods are aligned with the timing of the monitoring of a control channel for the purpose of beam failure recovery. The configuration information may be received from an access node serving the UE. The UE receives a PDCCH (block 1147). The UE determines a beam quality of a beam between the access node and the UE (block 1149). As an example, the UE measures reference signals transmitted by the access node to determine the bean quality. As another example, the UE measures transmissions made by the access node to determine the beam quality. As yet another example, the UE measures control information transmissions made by the access node to determine the beam quality. The UE determines that the beam quality does not meet a threshold and sends a PRACH in a DTX-ON period (block 1151). The PRACH triggers a beam management procedure, such as a beam recovery procedure, re-training, and so on.

Figure 12A:
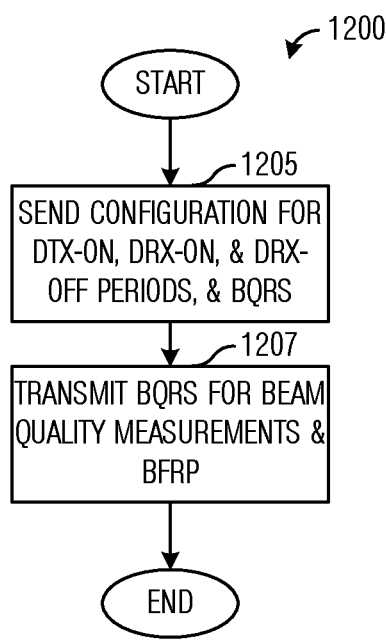
FIG. 12A illustrates a flow diagram of example operations occurring in an access node operating in aligned beam failure monitoring and DRX modes according to example embodiments described herein.

FIG. 12A illustrates a flow diagram of example operations 1200 occurring in an access node operating in aligned beam failure monitoring and DRX modes. Operations 1200 may be indicative of operations occurring in an access node as the access node operates in aligned beam failure monitoring and DRX modes.

Operations 1200 begin with the access node configuring DTX-ON periods and DRX mode (including DRX-OFF or DRX-ON periods), and a BQRS (block 1205). The configuration of the periods may include specifying start times, durations, stop times, periods, and so on. The configuration of the period may include network resources (such as time resources, frequency resources, or time and frequency resources) where the BQRS will be transmitted, BQRS sequence information (such as sequence identifier), BQRS-ON period information, and so on. The access node transmits the BQRS for beam quality measurements, as well as for BFRPs (block 1207). The periods (e.g., BQRS-ON periods and BFRP windows) are aligned in time. The periods may be aligned at their starting times, their ending times, or both their starting and ending times.

Figure 12B:
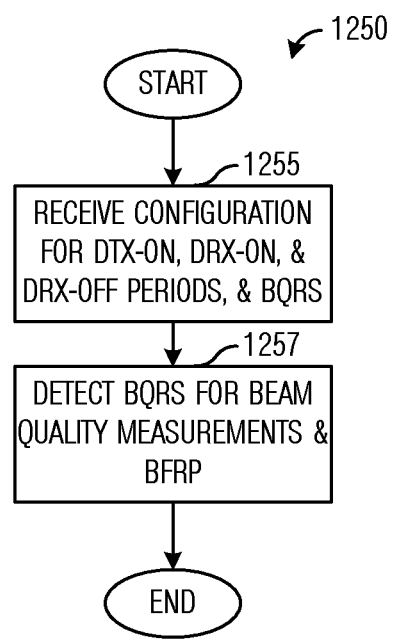
FIG. 12B illustrates a flow diagram of example operations occurring in a UE operating in in aligned beam failure monitoring and DRX modes according to example embodiments described herein.

FIG. 12B illustrates a flow diagram of example operations 1250 occurring in a UE operating in in aligned beam failure monitoring and DRX modes. Operations 1250 may be indicative of operations occurring in a UE as the UE operates in aligned beam failure monitoring and DRX modes.

Operations 1250 begin with the UE receiving configuration information for DTX-ON periods and DRX mode (including DRX-OFF or DRX-ON periods), and a BQRS (block 1205). The configuration information of the periods may include specifying start times, durations, stop times, periods, and so on. The configuration information of the BQRS may include network resources (such as time resources, frequency resources, or time and frequency resources) where the BQRS will be transmitted, BQRS sequence information (such as sequence identifier), BQRS-ON period information, and so on. The UE detects the BQRS for beam quality measurements, as well as for BFRPs (block 1257). The periods (e.g., BQRS-ON periods and BFRP windows) are aligned in time. The periods may be aligned at their starting times, their ending times, or both their starting and ending times.

Figure 13:
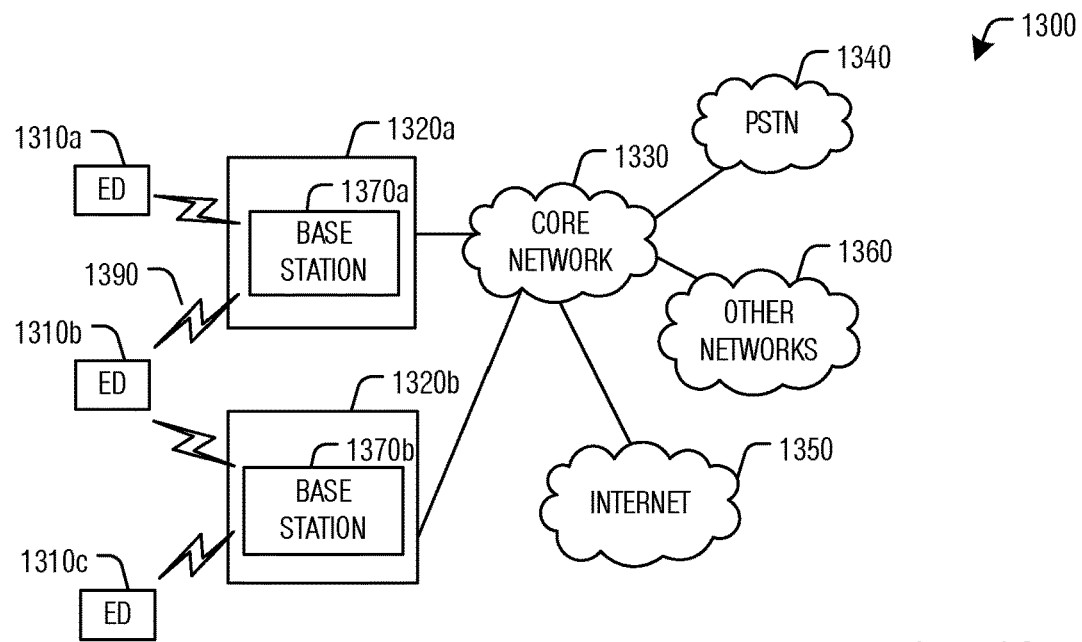
FIG. 13 illustrates an example communication system according to example embodiments described herein.

FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1300 includes electronic devices (ED) 1310a-1310c, radio access networks (RANs) 1320a-1320b, a core network 1330, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate or communicate in the system 1300. For example, the EDs 1310a-1310c are configured to transmit or receive via wireless or wired communication channels. Each ED 1310a-1310c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 1310a-1310c to enable access to the core network 1330, the PSTN 1340, the Internet 1350, or the other networks 1360. For example, the base stations 1370a-1370b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1310a-1310c are configured to interface and communicate with the Internet 1350 and may access the core network 1330, the PSTN 1340, or the other networks 1360.

In the embodiment shown in FIG. 13, the base station 1370a forms part of the RAN 1320a, which may include other base stations, elements, or devices. Also, the base station 1370b forms part of the RAN 1320b, which may include other base stations, elements, or devices. Each base station 1370a-1370b operates to transmit or receive wireless signals within a particular geographic region or area, sometimes referred to as a "cell." In some embodiments, multiple-input multiple-output (MIMO) technology may be employed having multiple transceivers for each cell.

The base stations 1370a-1370b communicate with one or more of the EDs 1310a-1310c over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1320a-1320b are in communication with the core network 1330 to provide the EDs 1310a-1310c with voice, data, application, Voice over Internet Protocol (VoIP), or other services. Understandably, the RANs 1320a-1320b or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 1310a-1310c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
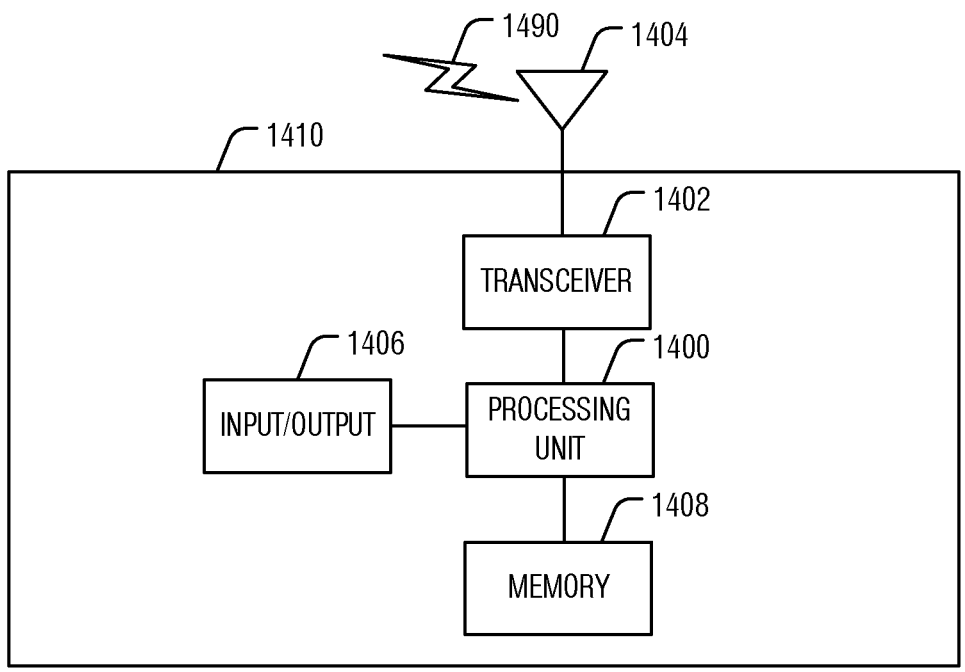
FIGS. 14A and 14B illustrate example devices that may implement the methods and teachings according to this disclosure.
Figure 14B:
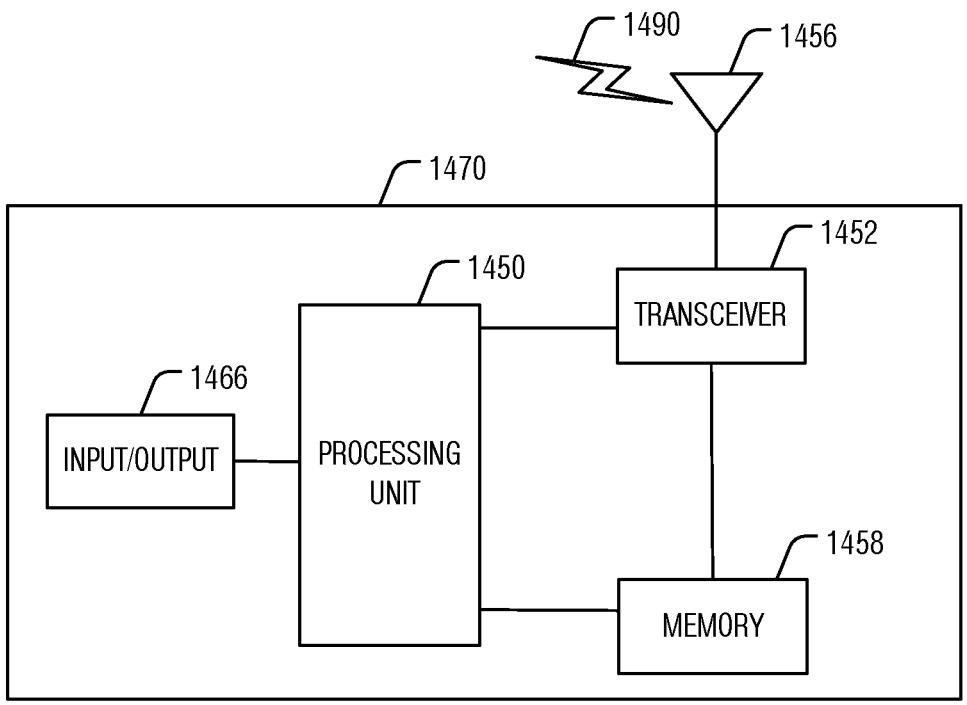

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission or processing signals received wirelessly or by wire. Each antenna 1404 includes any suitable structure for transmitting or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input/output devices 1406 or interfaces (such as a wired interface to the Internet 1350). The input/output devices 1406 facilitate interaction with a user or other devices (network communications) in the network. Each input/output device 1406 includes any suitable structure for providing information to or receiving information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. Each memory 1408 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input/output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile or non-volatile storage and retrieval device(s). Each input/output device 1466 facilitates interaction with a user or other devices (network communications) in the network. Each input/output device 1466 includes any suitable structure for providing information to or receiving/providing information from a user, including network interface communications.

Figure 15:
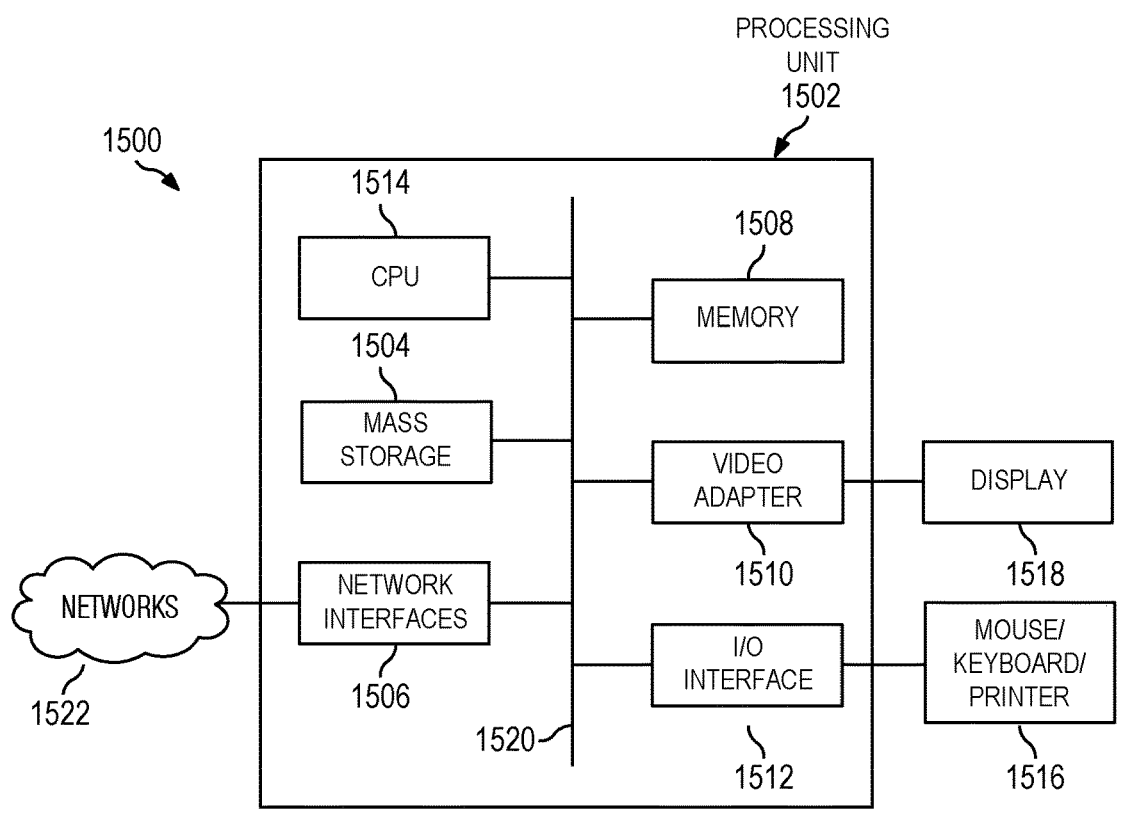
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU) 1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse, keyboard, or printer 1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, or wireless links to access nodes or different networks. The network interfaces 1506 allow the processing unit 1502 to communicate with remote units via the networks. For example, the network interfaces 1506 may provide wireless communication via one or more transmitters/transmit antennas and one or more receivers/receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a measuring unit or module, an initiating unit or module, or a detecting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer-implemented method for operating an access node, the computer-implemented method comprising:
   sending, by the access node to a user equipment (UE), configuration information of a discontinuous reception (DRX) mode including DRX-ON periods for sending physical downlink control channels (PDCCHs) to the UE, and configuration information for an uplink transmission associated with a DRX-ON period, the uplink transmission is configured for beam quality confirmation of a PDCCH transmitted during the DRX-ON period associated with the uplink transmission;
   receiving, by the access node, the uplink transmission, wherein a receive beam used to receive the uplink transmission and a transmit beam used to transmit the PDCCH transmitted during the DRX-ON period are beam correspondent; and
   determining, by the access node, a beam quality measurement for a channel between the access node and the UE in accordance with the received uplink transmission.

2. The computer-implemented method of claim 1, wherein the received uplink transmission comprises a sounding reference signal (SRS).

3. The computer-implemented method of claim 1, wherein determining the beam quality measurement comprises measuring a beam quality of the channel in accordance with the received uplink transmission.

4. The computer-implemented method of claim 3, wherein the beam quality measurement conveys information about the beam quality during the DRX-ON period associated with the uplink transmission.

5. The computer-implemented method of claim 1, wherein the beam quality measurement conveys information about an estimated beam quality during a subsequent DRX-ON period occurring after the DRX-ON period associated with the uplink transmission.

6. The computer-implemented method of claim 1, wherein the access node comprises a non-transitory memory storage storing instructions and one or more processors in communication with the non-transitory memory storage.

7. The computer-implemented method of claim 1, wherein the received uplink transmission comprises information about the beam quality measurement or an indicator of the beam quality measurement.

8. A computer-implemented method for operating a user equipment (UE), the computer-implemented method comprising:
   receiving, by the UE from an access node, configuration information of a discontinuous reception (DRX) mode including a DRX-ON period for receiving a physical downlink control channel (PDCCH) from the access node, and configuration information for an uplink transmission associated with the DRX-ON period, the uplink transmission is configured for beam quality confirmation of a PDCCH transmitted during the DRX-ON period associated with the uplink transmission;
   receiving, by the UE, the PDCCH during the DRX-ON period; and
   sending, by the UE, the uplink transmission in accordance with the PDCCH, wherein a transmit beam used to transmit the uplink transmission and a receive beam used to receive the PDCCH during the DRX-ON period are beam correspondent.

9. The computer-implemented method of claim 8, wherein the uplink transmission comprises a sounding reference signal (SRS).

10. The computer-implemented method of claim 8, further comprising determining by the UE, a beam quality measurement for a channel between the UE and the access node.

11. The computer-implemented method of claim 10, wherein the beam quality measurement conveys information about a beam quality during the DRX-ON period in which the PDCCH is received.

12. The computer-implemented method of claim 10, wherein the beam quality measurement conveys information about an estimated beam quality during a subsequent DRX-ON period occurring after the DRX-ON period in which the PDCCH is received.

13. The computer-implemented method of claim 8, wherein the uplink transmission is sent in accordance with a decoding result of the PDCCH.

14. The computer-implemented method of claim 13, wherein the uplink transmission is sent if the decoding result of the PDCCH is successful.

15. The computer-implemented method of claim 13, wherein the uplink transmission is sent if the decoding result of the PDCCH is unsuccessful.

16. A computer-implemented method for operating an access node, the method comprising:
   sending, by the access node, to a user equipment (UE) configuration information of a discontinuous reception (DRX) mode including DRX-ON periods for sending physical downlink control channels (PDCCHs) to the UE, and configuration information of a beam quality reference signal (BQRS) that is associated with a DRX-ON period, wherein the BQRS is configured for beam quality confirmation and beam failure recovery, wherein the BQRS has a spatial quasi-collocated (QCL) relationship with either a PDCCH transmitted during the DRX-ON period or a demodulation reference signal (DMRS) of the PDCCH transmitted during the DRX-ON period, and wherein the BQRS is also utilized in a simultaneously occurring beam failure recovery procedure; and
   sending, by the access node, the BQRS.

17. The computer-implemented method of claim 16, wherein the BQRS is sent during a beam failure recovery response (BFRP) window of the simultaneously occurring beam failure recovery procedure that is time-aligned with the DRX-ON period.

18. The computer-implemented method of claim 17, wherein the BFRP window and the DRX-ON period are time-aligned in at least one of their starting times, or their ending times.

19. The computer-implemented method of claim 16, wherein the BQRS is used to trigger a start of a monitoring for the PDCCH.

20. The computer-implemented method of claim 16, wherein the BQRS is used to trigger a stop of a monitoring for the PDCCH.

* * * * *